US008745235B2

(12) United States Patent
Keilhau et al.

(10) Patent No.: US 8,745,235 B2
(45) Date of Patent: Jun. 3, 2014

(54) NETWORKING SYSTEM CALL DATA DIVISION FOR ZERO COPY OPERATIONS

(75) Inventors: Timo Keilhau, Neustadt (DE); Eduard Siemens, Sehnde (DE)

(73) Assignee: Thomson Licensing, Issy-les-Moulineaux (FR)

( * ) Notice: Subject to any disclaimer, the term of this patent is extended or adjusted under 35 U.S.C. 154(b) by 135 days.

(21) Appl. No.: 13/095,567

(22) Filed: Apr. 27, 2011

(65) Prior Publication Data

US 2011/0270944 A1    Nov. 3, 2011

(30) Foreign Application Priority Data

Apr. 27, 2010    (EP) .................................. 10305439

(51) Int. Cl.
*G06F 15/173*    (2006.01)
(52) U.S. Cl.
USPC .......................................................... 709/226
(58) Field of Classification Search
CPC .......... G06F 9/544; G06F 9/545; H04L 69/16
USPC ......................................................... 709/226
See application file for complete search history.

(56) References Cited

U.S. PATENT DOCUMENTS

| 6,584,478 B1 * | 6/2003 | Spertus ................................. | 1/1 |
| 2009/0217377 A1 * | 8/2009 | Arbaugh et al. ................. | 726/23 |
| 2011/0096774 A1 * | 4/2011 | Qu et al. ........................ | 370/389 |

OTHER PUBLICATIONS

Tim Jones: "Boost socket performance on Linux", IBM developerWorks Homepage [online], Jan. 17, 2006, pp. 1-8, internet link: http://www.ibm.com/developerworks/linux/library/l-hiscock/index.html.*
Ernst W. Biersack, Erich Rutsche, Demultiplexing on the ATMAdapter: Experiments with Internet Protocols in User Space—B.P. 193 06904 Sophia Antipolis, Cedex France—Journal on High Speed Networks, vol. 5, No. 2, May 1996.*
Mathai Joseph, A multiprocessor operating system Chapter 2 The CCNPascal Language 1984, p. 16-17.*
Mathai Joseph, A multiprocessor operating system Chapter 2 the CCNPascal Language 1984,p. 18.*
Philippe Hanrigou, Introduction to Unix Signals and System Calls. Link: http://ph7spot.com/musings/introduction-to-unix-signals-and-system-calls.*
DefinitionSocket link: http://www.techterms.com/definition/socket Apr. 3, 2013.*

(Continued)

*Primary Examiner* — John Macilwinen
(74) *Attorney, Agent, or Firm* — Robert D. Shedd; Patricia Verlangieri

(57)    ABSTRACT

A method for sending data over a network from a host computer. The host computer includes an operating system comprising at least a user space and a kernel space. The amount of data provided from the user space to the kernel space within one system call exceeds the size of an IP packet. A loop function in an application in the user space sends multiple packets to the kernel space within a single system call containing IO vectors which contain pointers to the data in the user space. A last data unit being processed may be designated using a flag included in the message header. In the kernel space a second loop function is used to reassemble the vector groups and pass them down the network stack. The data may then be passed to the network hardware using a direct memory access transfer directly from the user space to the network hardware.

14 Claims, 5 Drawing Sheets

(56) References Cited

OTHER PUBLICATIONS

Trapeze/IP: TCP/IP at Near-Gigabit Speeds. A. Gallatin, J. Chase, K. Yocum, 1999 USENIX Annual Technical Conference. Monterey, California, USA, Jun. 6-11, 1999. pp. 1-12.*

M. Tim Jones, "Boost Socket Performance on Linux", pp. 1-8, published Jan. 17, 2006. (http://www.ibm.com/developerworks/linux/library/I-hisock.html).

Jin, Hai, Zhang, Minghu, Tan, Pengliu, "Light-weight Messages: True Zero-Copy Communication for Commodity Gigabit Ethernet", LNCS 4097, pp. 153-162, 2006 (http://www.springerlink.com/content/84916722305j7104/).

Stevens, W. Richard, "UNIX Network Programming","The Transport Layer: TCP and UDP", Chapter 2: pp. 29-53, 1998.

European Search Report dated Nov. 24, 2010 for EPO Application No. EP 10 305 439.1.

Stewart Cisco Q Xie L Yarroll Motorola J Wood Docomo USA Labs K Poon Sun Microsystems K Fujita NEC R R: "Sockets API Extensions for SCTP; draft-ietf-tsvwg-sctpsocket-03.txt", Jan. 29, 2002, vol. tsvwg, No. 3, Jan. 29, 2002, XP015029408, ISSN: 0000-0004.

Communication pursuant to Article 94(3) from the European Patent Office dated Jun. 18, 2013.

* cited by examiner

NETWORKING SYSTEM CALL DATA DIVISION FOR ZERO COPY OPERATIONS

FIELD OF THE INVENTION

The present invention relates generally to network data communications.

CROSS REFERENCE TO RELATED APPLICATIONS

This applications claims priority of co-pending European patent application Serial No. 10305439.1 filed Apr. 27, 2010 pursuant to 35 U.S.C. §119(a)-(d).

BACKGROUND OF THE INVENTION

In order to transfer a packet over a network, the packet data is passed from a user space of an operating system to a kernel space of the operating system. The data is handled and generated by a user or a computer application in the user space of the operating system. Network stacks usually reside within the kernel space of the operating system. A connection over a network is established and managed by the network hardware running the network stacks. A kernel routine runs in the network stack, each time data is passed downstream from the user space to the kernel space of the operating system. To process data in order to prepare it for sending over a network, a context switch from the user space to the kernel space is performed. For receiving data, a context switch from the kernel space to the user space is performed. These context switches are realized using system calls. A kernel routine associated with the respective system call is executed each time a system call is issued. A number of processing and validity checks are performed before the data is sent by the network hardware, e.g. via user datagram protocol (UDP). Every operation needed for preparing data to be transferred over the network hardware requires the intervention of the central processing unit (CPU) and therefore, blocks the CPU for a certain time. Thus, the network hardware causes a significant CPU payload.

FIG. 1 shows data handling according to an operating system 2. Data are available in a memory 14 in the form of data blocks 12, which are referenced by IO vectors. An IO vector is a pointer to a data block 12 of an application in addition to the length thereof. A system call 10 is used for passing a data block 12 from the user space 4 of an operating system 2 to the kernel space 6 of the operating system 2. In the kernel space 6, the data is prepared for being sent over the network by the network hardware 8. For each data block 12 to be passed to the kernel space 6, a separate system call 10 is needed. For example, the 'sendmsg' system call may be used for this purpose. The size of a data block 12 to be passed from the user space 4 to the kernel space 6 is limited by the size of an IP packet, (e.g. 64 kiloBytes (kB)). As the maximum transmission unit of the network hardware 8 is much lower, fragmentation of these data blocks 12 in the kernel space 6 is needed.

A known solution to reduce the processor overhead of context switches caused by system call execution is to accumulate small parts of data to be sent in a buffer and pass the accumulated data to the kernel within one system call. The number of system calls is thereby reduced as more data is passed from the user space to the kernel space within one system call and thus, the number of context switches is reduced. The system call uses an IO-vector structure to pass the accumulated fragments of data. A limitation of this solution is that the data fragments passed within one IO-vector to the kernel space must not exceed the size of one packet that can be sent over the network. The size of one packet that can be sent over the network is known as maximum transmission unit (MTU). In case of an UDP/IP packet, the MTU is 65535 Bytes (64 kB). Therefore, the amount of data passed to the kernel networking stack in case of UDP/IP within one system call is limited to 64 kB. In the case of other networking protocols, different MTUs exist. For example, the MTU of EthernetV2 is 1.5 kB and the MTU of Fast Ethernet using jumbo frames is up to 9 kB.

A well known system call in the Linux operating system used for the purpose of passing data from the user space to the kernel space is the 'sendmsg' system call. The kernel copies all the data to be passed with the system call from the user space into newly allocated buffers within the kernel space. This copy process is very CPU intensive. By way example, in the case a 10 Gbit networking system, the copying process using the 'sendmsg' system call is too slow and causes unsatisfactory performance. Aside from the data copying, other protocol computations are performed on the same CPU. This leads to serious payload and performance degradation of a computer in the case where a 10 Gbit networking hardware is operated.

A known solution is the use of the so called zero copy functionality based on the direct memory access (DMA) functionality of the computer hardware. For example, the system call 'sendfile' uses DMA. However, the usage of the 'sendfile' system call is restricted to data already stored within the kernel space or accessible via a file structure. A zero copy mechanism for user space data, (e.g. within the 10GE driver from Chelsio) "TCP Zero-Copy in the Chelsio T3 Family 10/1 Gb Ethernet driver (2008 Apr. 14), Chelsio Communications, Inc. 370 San Aleso Ave. Sunnyvale, Calif. 94085", already exists. However, a zero copy process for user defined transport protocols or unreliable transports (over UDP/IP) is necessary.

US2007/0223483 shows a communication endpoint processor that acts as an interface between computational and communication domains. Multiple frames of multiple sizes are collected and are passed from a user space of an operating system to a kernel space. The processor interrupts transmissions of lower priority frames in order to send higher priority frames. Passing data from the user space to the kernel space within one system call is restricted to a predetermined maximum size.

JP2001005767 shows a method to reduce the overall overhead caused by system calls while passing data, which are sent over a network interface, from the user space to the kernel space of an operating system.

SUMMARY

A method for sending data over a network that efficiently passes the data to be sent from the user space of an operating system to the kernel space and reduces the overhead caused by system calls while passing the data, while handling data in an operating system and sending the data over a network with increased network throughput.

According to an exemplary embodiment, a host computer sending data over a network is operated by an operating system that comprises at least a user space and a kernel space. The operating system uses system calls for providing the data to be sent over the network from the user space to the kernel space. The amount of data provided to the kernel space within one system call is allowed to exceed the size of an IP packet. This provides the advantage compared to the solution known in the art that more data than the size of one IP packet may be passed within one system call. Increasing the amount of data which may be passed within one system call from the user space to the kernel space of an operating system reduces the total number of system calls needed for passing a defined amount of data, and hence, for sending the data over the network. As each system call occupies the CPU for a certain number of CPU cycles, reducing the number of system calls also reduces the CPU payload.

The network interface sends the data in MTU-sized packets over the bus. By way of example, the operating system arranges with a routine running in user space, data to be sent into units of the size of the maximum transmission unit of the network or a fraction thereof. This pre-processing is done in user space for efficiently transferring the data into kernel space. In other words, in one embodiment, a large buffer in user space will be divided into MTU-sized blocks. This allows arrangement and fragmentation of the data into MTU-sized packets to not be done by the kernel anymore. This further reduces the CPU payload.

According to an exemplary method, a divisor is used along with the improved system call. With the divisor, the data to be passed from the user space to the kernel space of the operating system is divided into a predefined number of fractions. The divisor is set-up in the user space during arrangement and fragmentation of data. The divisor defines how many data units of a fixed but not necessarily equal length will be combined until the maximum transmission unit of the network is reached. This allows flexibility regarding the fragmentation of data. Quite often applications can't respect a single block size when writing data into memory. Introducing the divisor helps to provide the application much more flexibility in fragmenting the data in memory.

The use of the divisor also helps to pass the data contained in a buffer larger than the maximum IP packet size within one system call to kernel space. The system call for pushing the data into kernel space makes use of I/O vectors for describing where the data is located, and the size of the data block. The divisor combines a fixed amount of I/O vectors to one packet. This packet has, by way of example, the size of the MTU. Data units smaller than the MTU of the network may be passed from the user space to the kernel space of the operating system and easily combined in kernel space with the divisor. The data units which are combined in kernel space using the divisor may be smaller than the MTU size. In that case, the divisor may be larger than 1. A divisor equal to 1 may also be used. Accordingly, the packet is equal to or approximately the size of the MTU. In contrast to conventional methods, it is possible to pass x MTU-sized packets from user to kernel space, in one system call. Thus, the overhead created by x-1 conventional systems calls is avoided.

The following example illustrates the benefit of fewer system calls: When using a packet size of 8 kBytes (MTU=8 kB), an amount of 1 Gbyte equates to 125,000 system calls using the classical sendmsg call. This corresponds to a transfer time of less than one second at a data rate of 10 Gb/s. For the case where the enhanced call is used and the divisor is made equal to 1, there are only 32 system calls required using a packet size of 8 kB and a buffer size of 32 MB. For a buffer with size of 32 MB, there will be as many as 4,000 packets of size 8 kB. All of the packets will be passed to kernel space in one system call. The enhanced system call therefore loops 4,000 times. In each loop, the information about a piece of 8 kB is passed to kernel space. It takes 32 system calls to shift 1 Gb of data to kernel space. The solution according to this embodiment therefore saves 124,968 system calls and all the processing associated with them.

Preferably, an asynchronous transfer protocol is used for the network transfer. A well-known asynchronous transfer protocol is, for example, the user datagram protocol (UDP). Preferably, synchronous system calls, for example, 'sendmsg' are used for providing the data to be sent from the user space to the kernel space of an operating system. Using the method according to an embodiment of the invention for sending data over a network using an asynchronous transfer protocol is advantageous, because the method allows mapping of the synchronous system calls with the asynchronous network protocol.

The method uses direct memory access (DMA) for providing the actual data to the kernel space. Using direct memory access, with the so-called 'zero copy' mode as known in the art, byte by byte copying of the data from buffers associated to the user space to buffers associated to the kernel space is omitted.

In another embodiment, a flag available in the system call may be used to identify the last data unit to be sent. Using a flag available in the system call to identify the last data unit allows termination of the method after all data has been passed. For example, a flag provided by the system call but currently not in use is suitable for this purpose. On the other hand, a flag provided by the system call and used for other purposes which are dispensable may be used for identifying the last data unit to be sent. For example, using a 'sendmsg' system call, the 'MSG_More' flag may be used to identify the last data unit to be sent.

A loop function may be used in the kernel space to send data units over the network. The loop function performs the sending operation until the data unit identified as the last one, is reached. A destructor function may be used to end the DMA transfer after the data unit identified as the last one, is reached.

Systems configured to perform the above methods of network data communications are also provided.

BRIEF DESCRIPTION OF THE DRAWINGS

For better understanding, systems and methods of network data communications will now be explained in more detail in the following description with reference to the figures. It is understood that the invention is not limited to this exemplary embodiment and that specified features can also expediently be combined and/or modified without departing from the scope of the this written description.

DETAILED DESCRIPTION

Figure 2:
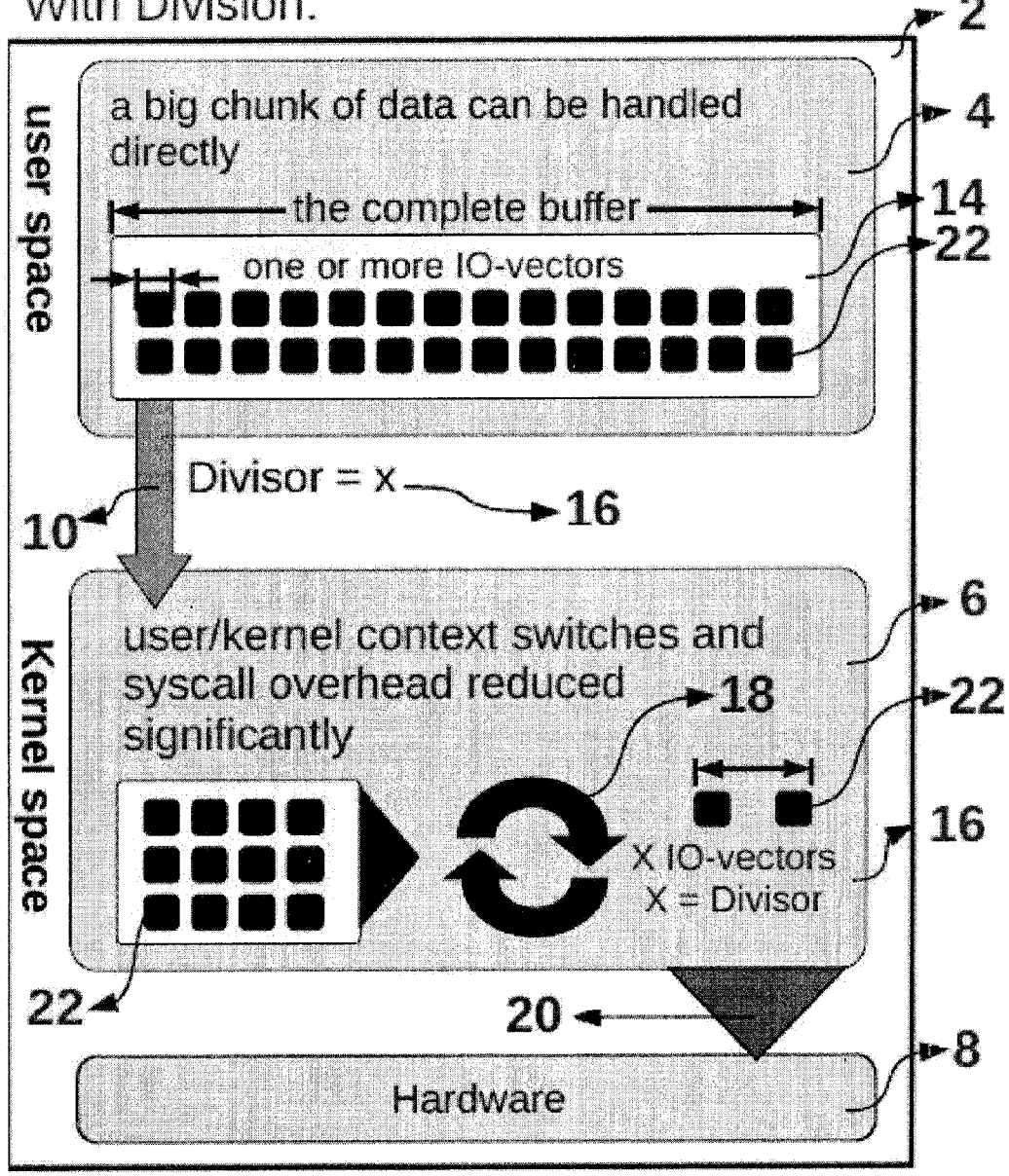
FIG. 2 is a block diagram illustrating a method performed in an operating system for sending data over a network according to an exemplary embodiment.

FIG. 2 shows an operating system 2 modified according to the invention. A system call 10 is used to copy data from the user space 4 to the kernel space 6. In order to send multiple user-space buffers 22, the system call 'sendmsg' is enhanced. The buffers 22 are spread across the memory 14 region of the application. These buffers 22 must be referenced by a message header struct (msghdr struct) which is passed to the mentioned system call 10 according to an exemplary embodiment. For example, the message header struct comprises the following e.g. elements:

```
struct msghdr
{
    void *msg_name;         /*Address to send to/receive from*/
    socklen_t msg_namelen;  /*Length of address data*/
    struct iovec *msg_iov;  /*Vector of data to send/receive into*/
    size_t msg_iovlen;      /*Number of elements in the vector*/
    void *msg_control;      /*Ancillary data (eg BSD filedesc passing)*/
    size_t msg_controllen;  /*Ancillary data buffer length*/
    int msg_flags;          /*Flags on received message*/
};
```

According to the invention, the struct msghdr is extended by the struct iovec*msg_iov; and size_t msg_iovlen; information.

By way of example, the struct iovec may appear as in the following:

```
struct iovec
{
    void *iov_base;   /*Pointer to data*/
    size_t iov_len;   /*Length of data*/
};
```

A socket descriptor and flags for specifying the message type are additional mandatory arguments. The msghdr struct consists of several fields describing the message to transfer. Fields mostly relevant for the described embodiments are those describing the IO-vectors (struct iovec*msg_iov; size_t msg_iovlen). This struct conceivably describes a large amount of IO-vectors. In the example described above, a buffer with a size of 32 MB of data is subdivided in units of 8,800 Bytes. These units themselves consist of a 12 Byte Header and a block of 8,788 Byte of payload data. The header and payload data does not need to be at the same location in memory. Therefore, both pieces will be referenced by two separate IO-vectors. The struct for the 32 MB buffer in the message header therefore will list 2*4,000 IO-vectors. A single IO-vector is a struct containing a pointer to one buffer of the application, and its length. The message header with the IO-vector struct plus an integer value for the divisor as a functional element will be handed to the improved system call on the kernel.

The system call is extended for passing a fourth parameter named iovec-divisor to the kernel instead of three parameters as known in the art. The semantics of the system call is changed accordingly. Thus, a big buffer is split into smaller parts. These smaller parts are of the size of one IP packet, or a fraction thereof. A new function is responsible for the task of splitting up the big buffer and handing the smaller parts down to the kernel networking stack with a number of loop iterations.

Figure 1:
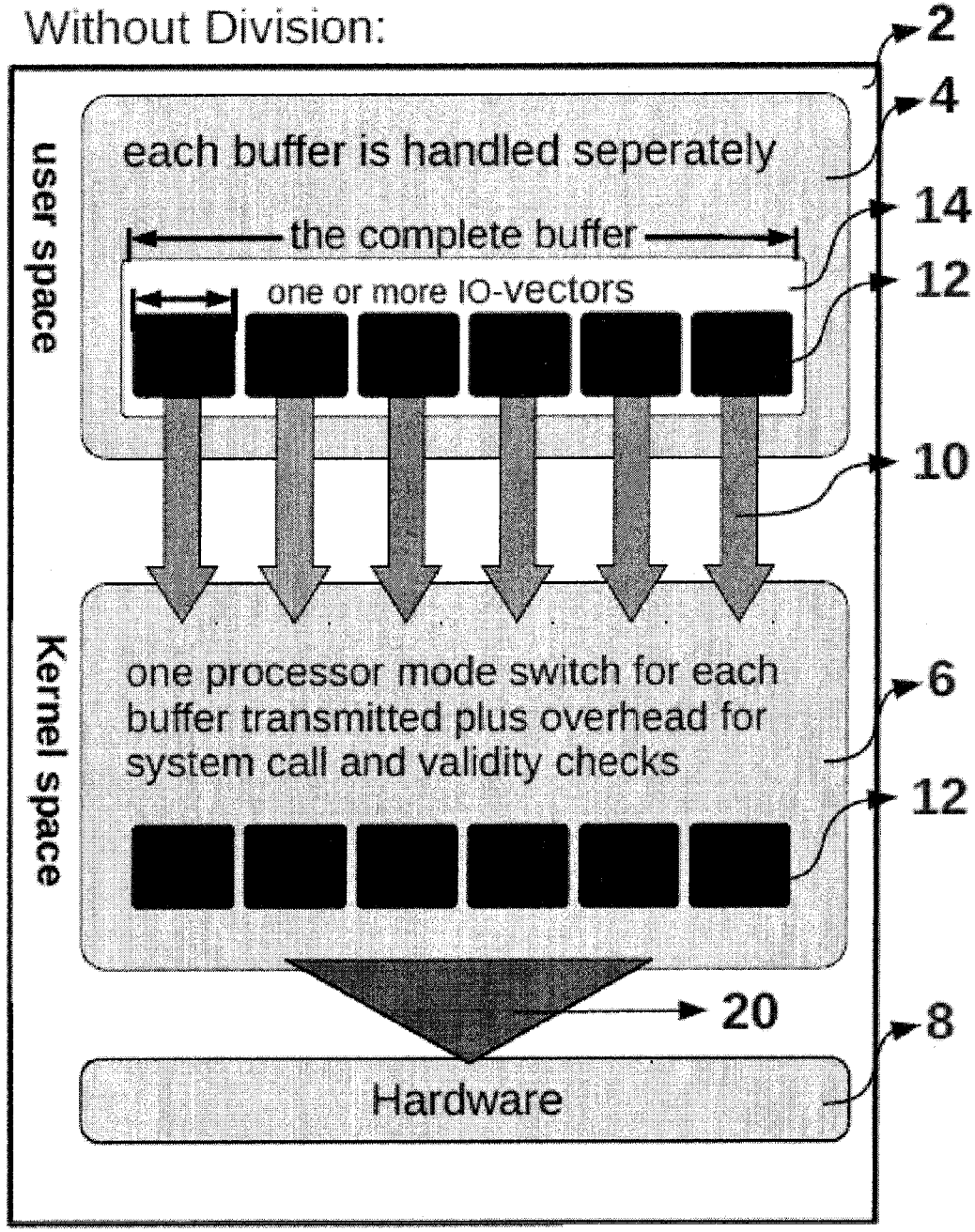
FIG. 1 is a block diagram illustrating a method performed in an operating system for sending data over a network as known in the art.

In case of a big buffer being transmitted over the network containing, by way of example, 4,505,600 bytes (512*8,800 bytes referenced by 1024 IO-vectors). Each buffer includes a higher protocol header (12 bytes) and a data block (8,788 bytes). Each header and each data block may reside anywhere in the application's memory 14. One data block with one associated header fit into one IP-packet with a size of 8,800 bytes, referenced by 2 IO-vectors. In FIG. 2, these 2 IO-vectors with a size of 12+8,788 bytes are combined into one small block. In the conventional method according to FIG. 1, the 'sendmsg' system call 10 is called 512 times in order to send the given data. Each system call 10 processes one IP packet, consisting of 2 IO-vectors (12+8788 byte). According to the method according to an embodiment depicted in FIG. 2, the enhanced system call 210 uses a divisor 16. As a result, the complete buffer (512*8,800 bytes) may be passed down into the kernel space. With the divisor set to 2, it is possible to assemble 512 IP packets while issuing only one system call 210, by passing iovec groups, each consisting of 2 IO-Vectors 12+8788 bytes. Only one system call 210 is necessary in order to send 512 IP packets. Therefore, only one context switch from user mode to kernel mode and one in the backward direction is necessary to pass the given amount of data to the networking stack. The call loops 512 times and handles two IO-vectors each pass. The call knows how many loop iterations to perform on account of the number of IO-vectors in the struct iovec and the divisor that has been handed over according to Equation 1.

Number of Loops=Amount of IO-vectors/Divisor     Equation (1)

Further, the method depicted in FIG. 2 comprises a second loop function 18 in which the new io-vector groups are assembled and passed down the network stack for further processing. Finally, the data is passed to the networking hardware 8 using a DMA transfer 20 directly from the user space. The DMA memory access is implemented e.g. in zero copy TCP implementation form.

Figure 5:
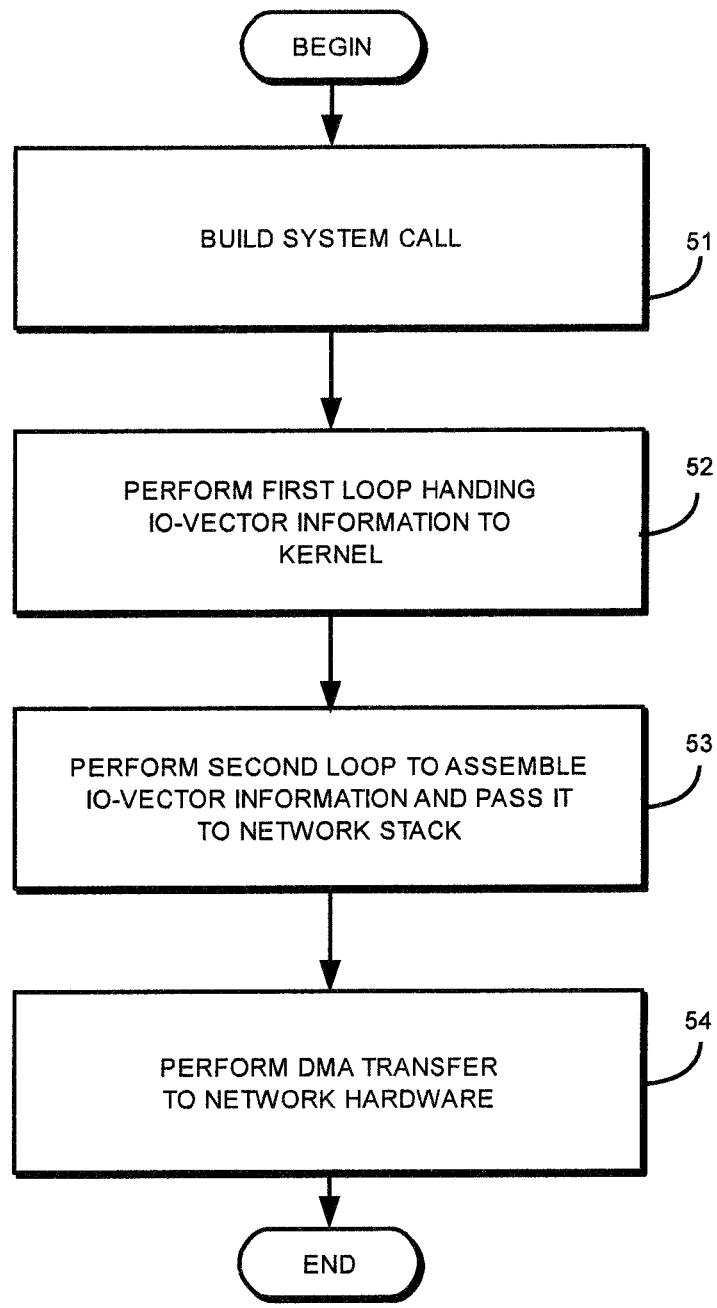
FIG. 5 is a process flow diagram for network data communication according to an exemplary embodiment.

The whole process consists of different steps as shown in FIG. 5. The first step is building a system call and providing information about IO-vectors in message header plus handing over the iovec-divisor 51. the second step is performing a first loop in which the IO-vector information is handed down to kernel 52. The third step is performing second loop in which IO-vector groups are assembled and passed down the network stack 53. The fourth step is the DMA transfer from user space to network hardware 54.

Referring again to FIG. 2, the usual 'sendmsg' system call (as well as other network-related system calls) is running synchronously. Thus, that system call 210 is blocking the memory blocks until data is passed to the networking hardware 8. When the application returns from the system call 210, the passed memory blocks can be reused by the application. On the contrary, the DMA transfer of the user data to the networking hardware 8 is performed asynchronously. Therefore, there is a need for mapping the synchronous system call operations with the asynchronous transfer of assembled IP packets to the networking hardware 8. For this purpose, each assembled IP packet except the last one is flagged (or marked) with a special flag. In a case of sending 512 packets, the first 511 packets will be marked. The 512th packet will not be marked. The message header structure ('msghdr') in the kernel is capable of carrying flags for such particular use. The absence of the 'MSG_MORE' flag in the 'msghdr' is appropriated as a signal for the end of the transmission. The lower layers use this flag as an indication that more data will come if the flag is set. Since the last message doesn't contain the flag, it is distinguishable from the others and marks the end of the transfer within the particular system call. The initial intention of the 'MSG_MORE' flag was that applications can signal the kernel that several small fragments shall be combined to one packet (this use is only possible with streaming services, like TCP). On datagram services (like UDP) it is safe to use this flag for our purpose, as it is an unnecessary flag. Still in the split up function, another mechanism is used for synchronization purposes. It is a variable called option memory ('omem'), which keeps track of how much data is put on the socket by the last packet. Thus, 'omem' indicates that there is unsent pending data to transmit. This information is utilized later in a wait function described below.

Thus two pieces of information may be signaled that way. First, the last packet of the transfer is flagged. Second, a pending transfer, which has not been confirmed as processed by the network hardware 8 is signaled with the 'omem' variable.

After the split up and flagging, the message headers ('msghdr') are pushed further down the networking stack. In the next steps the data is packaged into so called socket buffers. A socket buffer is a fundamental data structure within the Linux networking stack. Every packet sent or received is handled using this struct. The socket buffer represents the meta-data of a data packet regarding all the network layers down to the link layer. As the 'MSG_MORE' flag identifies the end of the transmission within one system call (the 512th packet in the example above), the last socket buffer is equipped with a custom destructor function. This destructor is invoked by the kernel if the networking hardware 8 confirms the end of DMA transfer from the user space buffer 4 to the networking hardware 8. After the generation of the socket buffer framework, the zero copy process begins and is accelerated by the asynchronous DMA transfer. Within one 'sendmsg' system call 210, all socket buffer structs are assembled and processed.

During the DMA transfer, the system call 210 goes to sleep if there are still pending IP-packets that are passed using DMA to the networking hardware 8. Since a relatively big chunk of data is passed within one system call 210 (some Megabytes), this DMA transfer may take milliseconds. Although during this time the user buffers 22, which are transferred by DMA, are blocked, the CPU may be assigned to other tasks within the operating system 2 by the operating system scheduler. Thus, the waiting task does not consume substantive additional resources. At the end of the DMA transfer of the last IP packet, the destructor registered within the appropriated socket buffer is called. The main task of the destructor function is to decrement the 'omem' mentioned above and awaken the system call 210 if it has been put to sleep. Therefore, the system call 210 will return control back to the application. In case the network hardware 8 processes the work request so fast that the returning call has not yet been put to sleep, the destructor will be launched, but the function can not wake up anything (the task is not in a wait queue at this point in time). This is avoided, however, because the wait function checks the 'omem' value and decides if it's generally necessary to put the system call 210 to sleep. If the data has already been transmitted, it's not necessary to submit a wait queue and to put the task to sleep. In this case the system call 210 may return to the application and the application can safely free the buffer.

A certain amount of CPU resources consumed by the state of the art network communication model could be saved. While using this invention the CPU resources saved could be used for other purposes, for example, for protocol computations.

Figure 3:
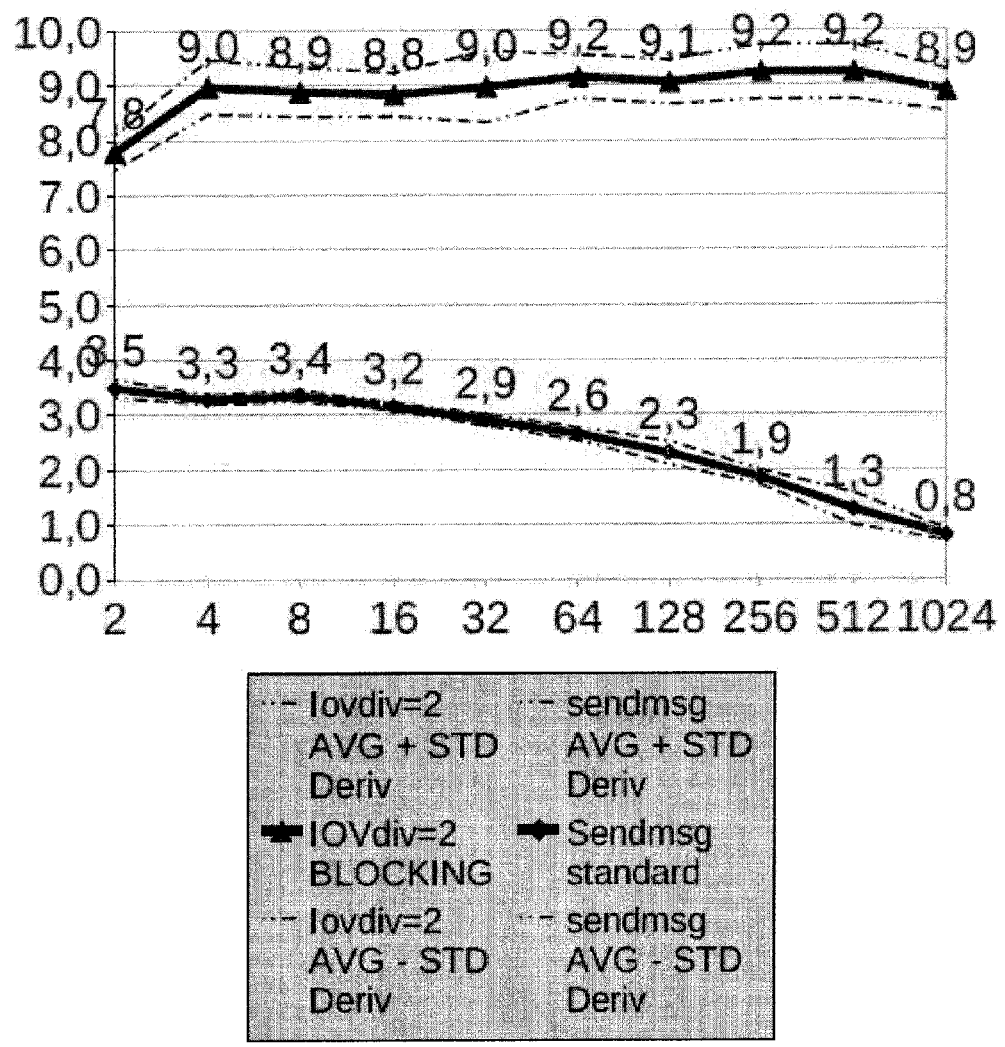
FIG. 3 is a graph showing a data rate for sending data using a method according to an embodiment and to a known method.

Sending data using the state of the art system call sendmsg, results in the following UDP transmission speeds achieved on a 1000 Mhz processor:
 best: 3.5 Gbit two IO-Vectors with a size of 12/8,788 Bytes
 worst: 0.8 Gbit 1024 IO-Vectors with a size of 12/5 Bytes each pair With use of the network data communication of the described embodiments, a notable increase in performance is apparent:
 best: 9.2 Gbit 512 IO-Vectors with a size of 12/8,788 Bytes each pair
 worst: 7.8 Gbit two IO-Vectors with a size of 12/8,788 Bytes FIG. 3 shows the difference between sending data rates for a state of the art implementation and for the described embodiments. The lower lines represent transmission speeds in [Gbitis] by the system call 'sendmsg' with no modifications. The upper lines show transmission speeds in [Gbit/s] with kernel modifications, according to the described embodiments. Each value is an average over 11 measurements transferring about 4.6 GB of data over a switched 10 Gbit/s network. The CPU is an AMD 1000 MHz processor. The x-axis reflects the number of used IO-vectors between 2 and 1024. The conventional system call 'sendmsg' performs worst while the modified method remains nearly constant in data transfer speed.

Figure 4:
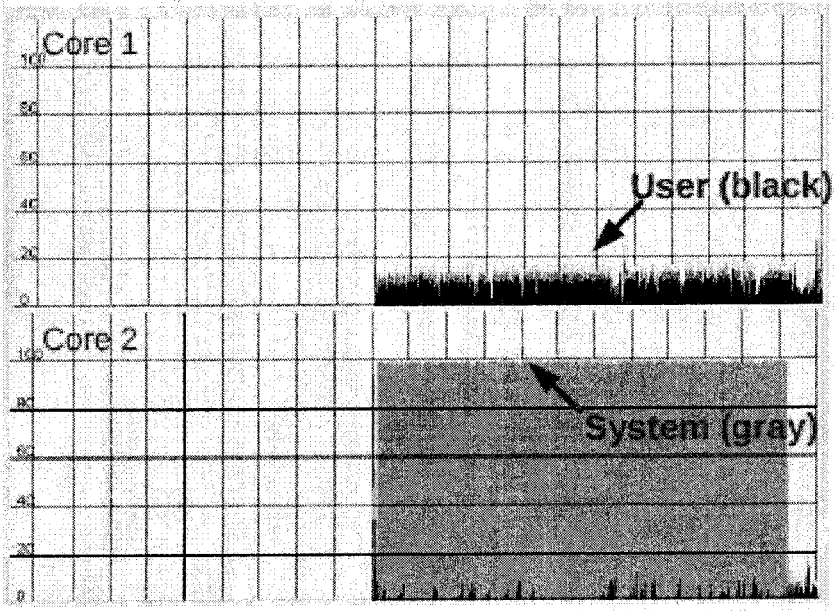
FIG. 4 is a graph showing CPU usage while sending data using a method according to an embodiment and to a known method.
Figure 4:
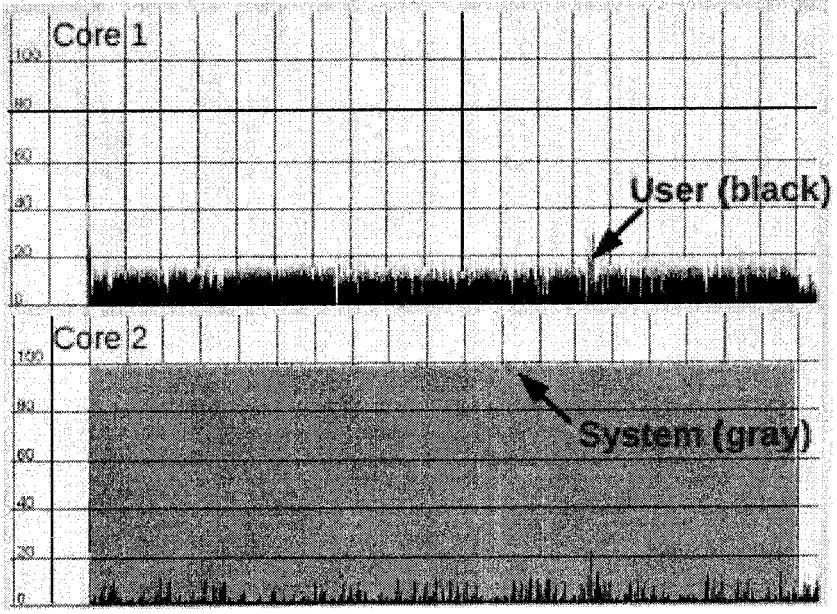

FIG. 4 shows the CPU usage consumed by user and system (kernel) processes while transmitting data over the network. The black graph shows the CPU usage of the processes in user space. The gray graph shows the utilization of kernel processes. As seen in the diagram, the system is equipped with 2 CPU cores. For each measurement 360.4 GB of data is transmitted. The upper graph uses the speedup implementation in accordance to the described embodiments while the lower sends with a state of the art method. It can be seen that the first transmission is complete 237 seconds earlier than the second one, while keeping the CPU usage constant.

Some aspects of implementing the described embodiments for networking system call data division may be performed in software. Software may take the form of instructions stored upon a non-transitory machine-readable medium. The instructions, when executed by a processor may cause the processor to perform various functions or perform process steps in implementing the described embodiments for networking system call data division. For example, software instructions may configure a processor to execute instructions to run a user application of division of the data buffer into MTU sized portions.

In one embodiment, the software may be provided, for example, on a per download basis into memory for execution. Accordingly, a stream of computer program data once downloaded into memory of a computer and executed provides the functionality of providing an amount of data from a user space in a computer operating system to a kernel space of the computer operating system, wherein the amount of data exceeds the size of an IP packet within one system call. The non-transitory machine readable medium may further comprise instructions that when executed by a processor cause the processor to perform the step of arranging in the user space the data into units having a size of a maximum transmission unit of a network or a fraction thereof. The processor according to instructions may further perform the step of providing a divisor to indicate how many data units are combined to reach the maximum transmission unit size of the network. Still further, the processor may be configured to perform the steps of using asynchronous transfer protocol for data transfer to a network, using direct memory access for providing the data to the kernel space, and designating a flag available in the system call to identify a last data unit to be sent. The processor may be configured to perform the step of using a synchronous system call, implementing a loop function in the kernel space to send data units over a network until the last data unit to be sent, is reached, and providing a destructor function to end a direct memory access transfer after the last data unit is reached.

While the foregoing describes exemplary embodiments and implementations, it will be apparent to those skilled in the art that various modifications and variations can be made to the present invention without departing from the spirit and scope of the invention.

What is claimed is:

1. A method for sending data over a network from a host computer, the host computer being operated by an operating system, the operating system comprising at least a user space and a kernel space, the method comprising:
providing an amount of data that exceeds the maximum size of an internet protocol (IP) packet according to IP protocol to the kernel space within one system call, wherein data to be sent in the one system call is arranged in a plurality of user space buffers, each user space buffer having a size of one maximum transmission unit (MTU) of the employed network technology, and wherein the total size of the data arranged in the plurality of user space buffers exceeds the maximum size of said IP packet; and
enhancing the system call to include a loop function configured to send the data of one of the user space buffers over the network for each loop iteration, wherein the loop is iteratively executed until a user space buffer identified as the last user space buffer associated with the system call is processed by the loop function based on a divisor indicating how many data units, represented as input/output (I/O) vectors, are combined to reach the size of one MTU of the network.

2. The method of claim 1, further comprising using asynchronous transfer protocol for the network transfer.

3. The method of claim 1, further comprising using direct memory access for providing the data to the kernel space.

4. The method of claim 1, further comprising designating a flag available in the system call to identify a last data unit to be sent.

5. The method of claim 4, further comprising providing a destructor function to end a direct memory access transfer after the data unit, which is identified as being a last data unit to be sent, is reached.

6. The method of claim 1, wherein the method uses a synchronous system call.

7. The method of claim 1, wherein a message header data structure is passed to the system call by an application executing in the user space, the message header data structure including at least an integer value indicating the value of the divisor, and at least one I/O vector identifying the data sent in the one system call.

8. A non-transitory machine readable medium, upon which are stored instructions, the instructions when executed by a processor cause the processor to perform the step of:
providing an amount of data from a user space in a computer operating system to a kernel space of the computer operating system, wherein the amount of data exceeds the maximum size of an IP packet according to IP protocol within one system call, and wherein data to be sent in the one system call is arranged in a plurality of user space buffers, each user space buffer having a size of one maximum transmission unit (MTU) of the employed network technology, and wherein the total size of the data arranged in the plurality of user space buffers exceeds the maximum size of said IP packet; and
enhancing the system call to include a loop function configured to send the data of one of the user space buffers over the network for each loop iteration, wherein the loop is iteratively executed until a user space buffer identified as the last user space buffer associated with the system call is processed by the loop function based on a divisor indicating how many data units, represented as input/output (I/O) vectors, are combined to reach the size of one MTU of the network.

9. The non-transitory machine readable medium of claim 8, further comprising instructions that when executed by a processor cause the processor to perform the step of using asynchronous transfer protocol for data transfer to a network.

10. The non-transitory machine readable medium of claim 8, further comprising instructions that when executed by a processor cause the processor to perform the step of using direct memory access for providing the data to the kernel space.

11. The non-transitory machine readable medium of claim 8, further comprising instructions that when executed by a processor cause the processor to perform the step of designating a flag available in the system call to identify a last data unit to be sent.

12. The non-transitory machine readable medium of claim 11, further comprising instructions that when executed by a processor cause the processor to perform the step of providing a destructor function to end a direct memory access transfer after the data unit, which is identified as being a last data unit is reached.

13. The non-transitory machine readable medium of claim 8, further comprising instructions that when executed by a processor cause the processor to perform the step of using a synchronous system call.

14. The non-transitory computer readable medium of claim 8, wherein the processor, upon executing instructions, passes a message header data structure to the system call by an application executing in the user space, the message header data structure including at least an integer value indicating the value of the divisor, and at least one I/O vector identifying the data sent in the one system call.

* * * * *